Oct. 28, 1952  F. E. STOREY  2,615,573
OIL FILTER
Filed Nov. 22, 1948
Fig. 1.
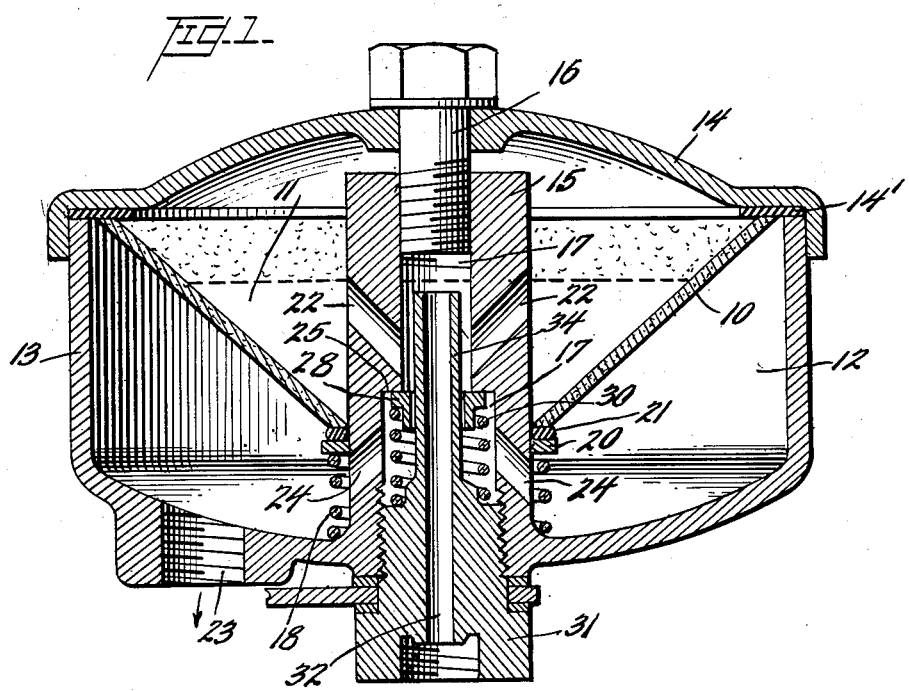
Fig. 2.
Fig. 3.
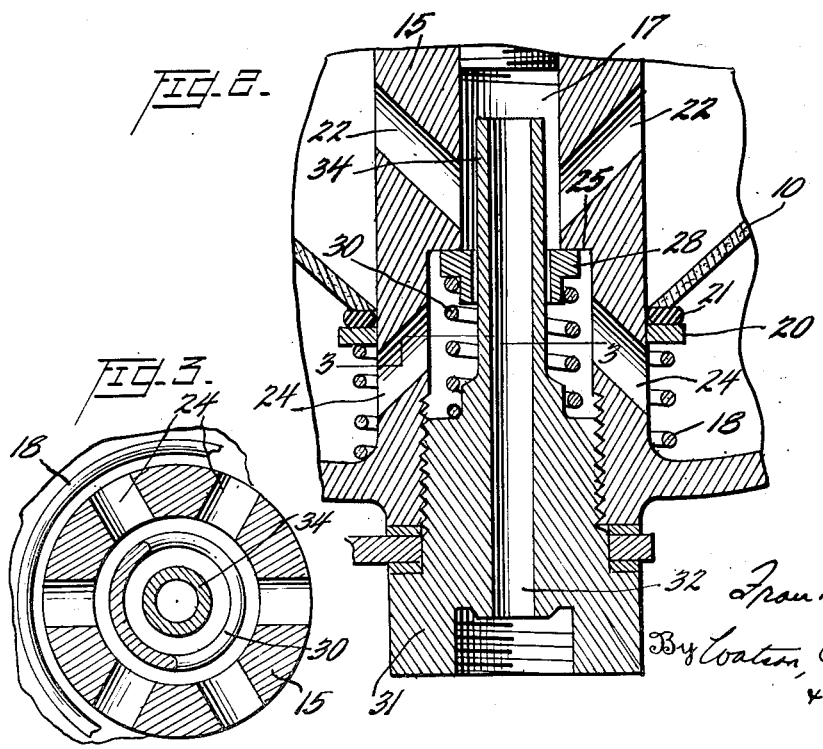
Inventor
Frank E. Storey
By Watson, Cole, Grindle
& Watson
ATTORNEYS Patented Oct. 28, 1952

2,615,573

UNITED STATES PATENT OFFICE 2,615,573

OIL FILTER

Frank E. Storey, Grosse Pointe Woods, Mich., assignor to Packard Motor Car Company, Detroit, Mich., a corporation of Michigan Application November 22, 1948, Serial No. 61,426

4 Claims. (Cl. 210—166)

The lubrication system of an internal combustion engine must of necessity be of such construction as to ensure an adequate flow of lubricating oil to the engine bearings while the engine is in operation and consequently must be so designed that any filter which it includes will be by-passed in the event that clogging of the filter element materially diminishes the flow of oil to the engine bearings. In general, this need has been recognized and the engine lubrication systems presently used, although generally satisfactory in that they include by-pass means, are for the most part subject to the objection that the filter element by-pass valve, operation of which infrequently occurs, are subject to sticking and also that when the by-pass valve is operated the stream of incoming oil is directed across the surface of the clogged filter element, causing the oil to pick up sludge and other foreign material collected on the filter, thereby contaminating the oil delivered to the engine bearings.

The purpose of this invention is to provide an oil filter which embodies the satisfactory features of filters now in use but which is so designed and constructed as to wholly avoid the possibility of the by-pass valve sticking, or of contamination of the oil which is being by-passed with impurities from the surface of the clogged filter element. To prevent sticking of the by-pass valve there is provided a novel arrangement of by-pass valve and valve guide whereby a continuously moving film of oil is caused to pass between the valve and the valve guide at all times. This constantly flowing oil film obiates the possibility of the valve sticking upon its guide and ensures a ready operation of the by-pass means whenever the filter becomes clogged.

Contamination of the oil which is diverted by the operation of the by-pass, by impurities which have previously collected upon the filter element, is avoided by providing a novel arrangement of by-pass ducts which cause the by-passed oil to pass through the filter without making contact with, or sweeping over the surface of, the filter element.

A preferred embodiment of the invention is illustrated in the accompanying drawings and will be described in detail.

In the drawings:

Figure 1 is an axial cross-section through the filter;

Figure 2 is an enlarged view of a portion of the filter as shown in Figure 1 showing the novel by-pass means and illustrating its relationship to the associated filter elements; and Figure 3 is a section on line 3—3 of Figure 2.

In the embodiment of the invention selected for disclosure by way of example the filter element or cartridge 10 is in the form of an inverted frustum of a cone and is so disposed within a fluid-tight housing or casing that the enclosed space is divided thereby into two chambers, the upper chamber 11 into which oil to be filtered is pumped, and the lower chamber 12 in which filtered oil is collected. The casing comprises a generally cup-shaped member 13 and a cap or cover 14 detachably secured in place. The annular upper end-surface of the filter element 10 bears against the under-surface of a gasket 14' disposed between the edge of member 13 and the under-surface of the cover 14. Its lower annular end-surface closely encircles a cylindrical core 15 which is preferably coaxial with the cylindrical wall of member 13 and integral with its bottom. The cover 14 is detachably held in position by a screw bolt 16, the threaded lower end of which enters the correspondingly threaded upper end of a duct or passage 17 which passes through the core 15, and the filter element is maintained in the position in which it is shown, pressed tightly aginst gasket 14, by the pressure of the upwardly acting helical spring 18, coaxial with core 15. Interposed between the upper end of the spring 18 and the lower end of the filter element 10 are the rings 20 and 21, the former being a movable abutment for the spring 18 and the latter a sealing ring, adapted to maintain fluid-tight contact with the cylindrical wall of the core 15.

In the normal operation of the filter, oil to be filtered issues from the upwardly and outwardly inclined ducts 22 formed in the wall of core 15 and which communicate with its central oil supply passage, the oil thus flowing into the upper chamber 11 then passing through the filter 10 into the oil collecting chamber 12 and eventually being withdrawn through the oil escape aperture 23. The filterable impurities contained in the oil will remain upon the upper surface of the cartridge 10. When the layer of solids upon the upper surface of the filter element becomes so thick that flow of oil through the filter is seriously reduced, the by-pass means now to be described will function and the incoming oil will be delivered directly and in unfiltered condition to the oil collecting chamber 12.

Below the filtering element 10 the oil delivery passage 17 is in direct communication with the oil collection chamber 12, downwardly and outwardly inclined ducts 24, formed in the wall of the member 15 being always open. However, a by-pass valve is so disposed within passage 17 that, under normal circumstances, incoming oil must of necessity flow through the upper ducts 22 into the upper chamber 11 instead of through ducts 24 into the lower chamber 12. This valve is indicated at 28 and comprises an annular member normally urged toward and maintained in closed position, in contact with an annular downwardly facing shoulder 25 comprising a valve seat located between ducts 22 and ducts 24, by a helical spring 30. The upper end of this spring bears at all times against the under-surface of the valve and its lower end rests upon the upper surface of a threaded plug 31 fitted into the lower end of passage 17.

This plug has an axial cylindrical upwardly extending portion 34 of reduced diameter which passes through, and comprises a guide for, the by-pass valve 28. The diameter of the cylindrical inner surface of the aperture in the valve is, however, slightly greater than the diameter of the guide 34, there being thus left between the mutually facing surfaces of valve and guide an annular passage of such width as to ensure the free flow of a thin film-like stream of oil at all times. Conveniently, oil to be filtered may flow to passage 17 through a duct 32 formed in plug 31 and its extension 34, being discharged into the passage at a point just below the lower end of screw bolt 16, which serves to seal the upper end of the passage.

Because of the constant flow of oil between valve guide 34 and valve 28 a portion of the oil flowing through the filter under normal conditions will not actually pass through the filter element 10 but the amount will be relatively small and the filtering efficiency of the unit not appreciably lowered. The benefit realized by eliminating all possibility that the by-pass valve may stick greatly outweighs the slight loss of filtering efficiency and the arrangement is such that, when the by-pass valve is opened by rise in oil pressure in the upper chamber 11 the stream of by-passed oil will flow directly into the lower chamber, sludge and impurities intercepted by the filter element being trapped in the upper chamber until the casing is opened and the clogged filter element removed and replaced.

Having thus described the invention, what is claimed as new and desired to be secured by Letters Patent is:

1. A filter comprising a casing defining a chamber having an oil outlet opening, a filter element dividing said chamber into oil receiving and oil collecting spaces, a central core in said casing provided with an oil inlet passage with ducts leading from said passage to both said spaces, said passage having a valve seat intermediate said ducts, an oil inlet fitting extending into said passage, an annular valve guided on said fitting, and a valve closure element normally positioning said valve against said seat to prevent substantial oil flow from said passage through one of said ducts to said oil collecting space, said valve permitting substantial oil flow to said last mentioned space when the oil pressure in the oil receiving space becomes excessive.

2. In a filter, a chamber for liquid under superior pressure, a second chamber for liquid under inferior pressure, said chambers having a common wall comprising a filter element, means defining a by-pass duct connecting said chambers, an oil inlet fitting positioned within said duct and an annular valve guided on said fitting, said valve normally maintaining said duct substantially closed, the entire mutually facing surfaces of said valve and fitting defining a passage which permits a constant flow of liquid through said by-pass duct, thus obviating the possibility of the valve sticking to the valve guiding surface of the fitting.

3. A filter comprising a casing defining a chamber having an outlet opening, a filter element dividing said chamber into liquid receiving and liquid collecting spaces, a central core in said casing provided with an inlet passage with ducts leading from said passage to both said spaces, a valve, a valve seat and a valve guide disposed in said passage intermediate said ducts, a valve closure element normally positioning said valve against said seat preventing substantial liquid flow from said passage through one of said ducts to said collecting space, the entire mutually facing surfaces of said valve and valve guide defining a passage which permits a constant flow of liquid between said valve and guide, said valve permitting substantial liquid flow to said collecting space when pressure in the receiving space becomes excessive.

4. A filter comprising a casing defining a chamber having a liquid outlet opening, a filter element dividing said chamber into liquid receiving and liquid collecting spaces, a central core in said casing having an inlet passage with ducts leading from said passage to both said spaces and a valve seat intermediate said ducts, a cylindrical liquid inlet fitting extending into said passage and an annular valve guided on said fitting and defining therewith a channel which permits a constant flow of liquid between said valve and fitting, a valve closure element normally positioning said valve against said seat preventing substantial liquid flow from said passage through one of said ducts to said collecting space, and permitting substantial liquid flow to said last named space when pressure in the receiving space becomes excessive.

FRANK E. STOREY.

REFERENCES CITED

The following references are of record in the file of this patent:

UNITED STATES PATENTS

| Number | Name | Date |
| --- | --- | --- |
| 1,871,958 | Chryst | Aug. 16, 1932 |
| 2,203,495 | Kamrath | June 4, 1940 |
| 2,389,814 | Pond et al. | Nov. 27, 1945 |

FOREIGN PATENTS

| Number | Country | Date |
| --- | --- | --- |
| 187,241 | Great Britain | Nov. 1, 1923 |